(12) United States Patent
Irwin et al.

(10) Patent No.: US 6,478,709 B1
(45) Date of Patent: Nov. 12, 2002

(54) AXLE END PLAY ADJUSTMENT SYSTEMS AND METHODS

(75) Inventors: Earl James Irwin, Fort Wayne, IN (US); David Joseph Young, Kimmell, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/618,052

(22) Filed: Jul. 17, 2000

(51) Int. Cl.[7] ............................................. F16H 48/06
(52) U.S. Cl. ............................ 475/230; 74/400; 74/424
(58) Field of Search .................................. 475/230, 231, 475/242, 246; 411/222, 321; 74/400, 401, 424, 396, 397; 301/128

(56) References Cited

U.S. PATENT DOCUMENTS

| | | | |
|---|---|---|---|
| 1,513,966 A | | 11/1924 | Church |
| 3,115,790 A | * | 12/1963 | Cornish et al. ............. 475/230 |
| 3,198,036 A | | 8/1965 | Muller |
| 3,527,120 A | | 9/1970 | Duer et al. |
| 3,624,717 A | * | 11/1971 | Brubaker ..................... 475/230 |
| 3,853,022 A | | 12/1974 | Duer |
| 4,763,542 A | | 8/1988 | Darin |
| 5,234,388 A | | 8/1993 | Nordkvist |
| 5,269,731 A | * | 12/1993 | Sudder et al. .............. 475/230 |
| 5,620,388 A | | 4/1997 | Schlegemann |
| 5,951,426 A | * | 9/1999 | Forrest .................... 472/230 X |
| 5,984,822 A | * | 11/1999 | Schreier et al. ............. 475/230 |

FOREIGN PATENT DOCUMENTS

| | | | | |
|---|---|---|---|---|
| GB | 2086498 A | * | 5/1982 | ................. 475/230 |
| JP | 403051555 A | * | 3/1991 | ................. 475/230 |

* cited by examiner

*Primary Examiner*—Charles A Marmor
*Assistant Examiner*—Ha Ho
(74) *Attorney, Agent, or Firm*—Liniak, Berenato & White

(57) ABSTRACT

In a differential/mechanism for transmitting power from a drive shaft to the axle shafts of a motor vehicle, an axle shaft end play adjuster is threadingly disposed at the end of the axle shaft adjacent the differential pinion shaft. The end play adjuster limits the range of axially inward movement of the axle shaft. A axle shaft end play adjuster assembly includes a shaft supported for rotation about a longitudinal axis having a threaded portion located near an axial end of the shaft to support a washer and a threader adjustment member threadingly engaging the end of the axle shaft adjacent the differential pinion shaft. The adjustment members threaded onto the interior axial end of the axle shaft may respectively engage the associated side gear through a splined interface.

11 Claims, 7 Drawing Sheets

AXLE END PLAY ADJUSTMENT SYSTEMS AND METHODS

BACKGROUND OF THE INVENTION

1. Field of the Invention

This invention pertains to differential systems for motor vehicles and, more particularly, the invention pertains to end play adjustment systems and methods for axle shafts driven from a differential mechanism.

2. Description of the Prior Art

In conventional drivelines, particularly those for rear wheel drive vehicles, the left-hand and right-hand axle shafts extend laterally from a differential mechanism that includes side bevel gears in continuous meshing engagement with differential pinions supported rotatably on a pinion shaft carried on a differential carrier. The differential carrier is driven rotatably by a set of meshing bevel gears, one of which is driven by a drive shaft disposed substantially perpendicular to the axle shafts. The side bevel gears typically are connected rotatably to the axle shafts by a spline connection formed on a shoulder near the inboard ends of the axle shafts. Each axle shaft carries another shoulder at its axially innermost extremity, the second shoulder located adjacent the differential pinion shaft.

Located between the shoulders on the axle shaft is a recess that is axially aligned with the recess formed on the corresponding side bevel gear. A slotted washer, fitted within the recesses of the axle shaft and side bevel gear, limits outward axial movement of the axle shaft relative to the side bevel gear. However, because the recess formed on each bevel gear that receives the slotted washer is open at its axially inner surface, each axle shaft is free to move along the spline connection axially inward toward the differential pinion shaft.

Thus, there is a tendency for wear in the differential assemblies to cause play allowing the side yokes to shift axially inwardly relative to the differential case and jar or knock against the pinion shaft. It is possible that the axle shaft button of the conventional C-ring design can break off due to stress riser in which case the axle will exit the differential assembly. Moreover, the conventional assembly can lead to grinding away of the end of the side yoke causing excessive negative camber, which in turn can lead to uneven tire wear and poor driving stability. It can also cause particles of the side yokes to embed themselves in the differential clutch plates causing slippage of the differential unit resulting in a clunking or thumping noise. If the wear is left unchecked, it may increase to a point where the flange will shear or cut into the differential case causing a leakage of fluid and ultimately leading to complete destruction of the differential assembly.

The need exists for a solution to the problem of stress risers and side yoke wear caused by grinding of the yoke end against the differential pinion shaft which does not involve having to replace an entire side yoke.

SUMMARY OF THE INVENTION

It is an object of the present invention to provide means for limiting displacement of an axle shaft in both axial directions.

A device, according to the present invention, for limiting axial displacement of an axle shaft in a differential mechanism includes a shaft supported for rotation about a longitudinal axis having a threaded portion located near an axial end of the shaft to support a washer and a threaded adjustment member threadingly engaging the end of the axle shaft adjacent the differential pinion shaft.

The preferred embodiments of the present invention include adjustment members threaded onto the interior axial end of the axle shaft and, alternatively, an adjustment member that respectively engage the associated side gear through a splined interface. With these embodiments, the method of assembly is preformed in the following manner: the cross pin is pulled out of the case, and the shafts one at a time are inserted through the side gears where the adjustment member (collar) is fully threaded onto the shaft. The shaft is then pulled outboard until the spline on the adjustment member makes contact with the side gear spline. The adjustment member is then turned counterclockwise just enough to engage the splines. The shaft is then pulled outboard until the adjustment member flange abuts the side gear. The same procedure is then repeated for the other axle. Then the cross pin is assembled and locked in place.

With this arrangement, inboard movement of the shaft is confined to allow the splined feature of the adjustment member to keep the adjustment member from unthreading.

These and other structural and functional benefits of the present invention will become apparent from the following description and associated drawings.

DESCRIPTION OF THE PREFERRED EMBODIMENT

Figure 1:
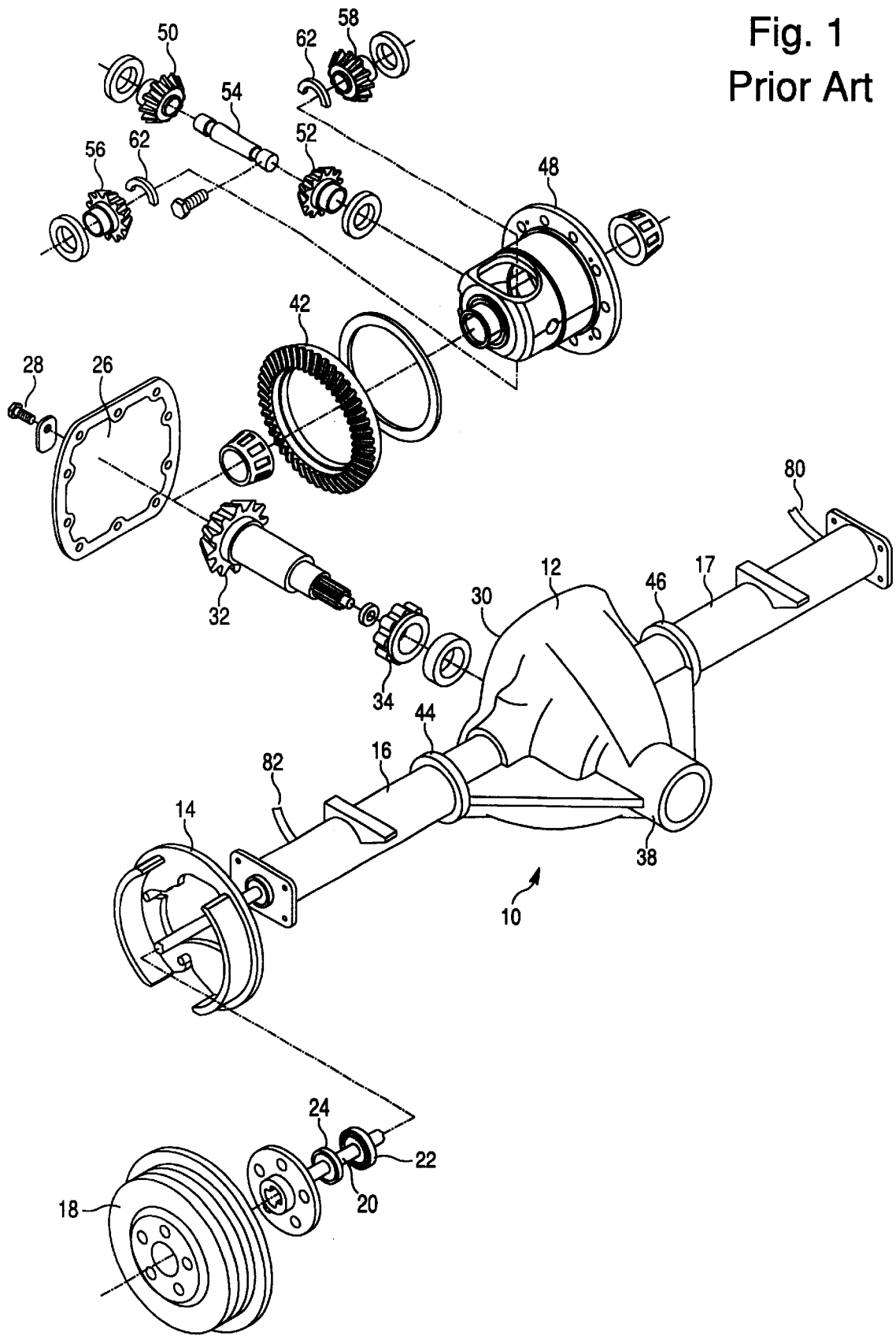
FIG. 1 is an exploded perspective view of an axle differential assembly.

Referring first to FIG. 1, an axle assembly, to which the present invention can be applied, includes axle housing 12, which contains a differential mechanism and a reservoir of hydraulic lubricant; brake assembly 14 located at the end of a tube 16 extending outboard from the ends of the axle housing 12; brake drum 18; axle shaft assembly 20; axle shaft bearing 22; and bearing seal 24.

A cover 26 is connected by bolts 28 to the rear face 30 of the housing 12 hydraulically seal the housing against the passage of lubricant.

Located within the differential case is a drive pinion 32 rotatably supported by a rear drive pinion bearing 34 and a front drive pinion bearing 36 supported on the inner surface of a portion of the axle carrier casing 38 that extends forward from the center line of the axle assembly. A driveshaft, driveably connected to the output shaft of a transmission, is connected through spline 40 to the shaft that drive pinion 32.

The differential mechanism, located within the differential case, includes a ring gear 42, in continuous meshing engagement with drive pinion 32 and supported rotatably on differential rear drive pinion bearing 34 and front drive pinion bearing 36 located within the housing gear and cylindrical extension 38 of the housing assembly 12.

The axle carrier assembly 12 also includes laterally directed tubular extensions 44, 46, which receive therein the ends of housing tubes 16 and 17, respectively. Located within the axle assembly 12 is a differential carrier 48, on which bevel pinion gears 50, 52 are supported for rotation on a differential pinion shaft or cross pin 54. Side bevel gears 56, 58 are in continuous meshing engagement with pinions 50, 52 and are driveably connected to left and right axle shafts 20 and 21, located respectively within tubes 16 and 17.

Axle shaft 20 is connected by a spline 60 to the corresponding side bevel gear 56. A slotted washer 62, such as that shown in FIG. 2, is fitted within a recess formed on the axle shaft 20 located between a shoulder 64, on which the external spline 60 is formed, and a terminal shoulder 66 located at the end of the axle shaft.

In accordance with the first embodiment of this invention, an axle shaft end play adjuster 68 is threadingly disposed on the terminal end of each axle shaft. The adjuster 68 is threaded onto the terminal shoulder 66 of the axle shaft, and after the differential cross pin 54 is installed the adjuster is threadingly adjusted against the differential pinion shaft or cross pin 54 to eliminate all end play of the axle shaft. It is envisioned that interference threads or thread adhesive may be used to prevent loosening of the adjuster 68.

Figure 2:
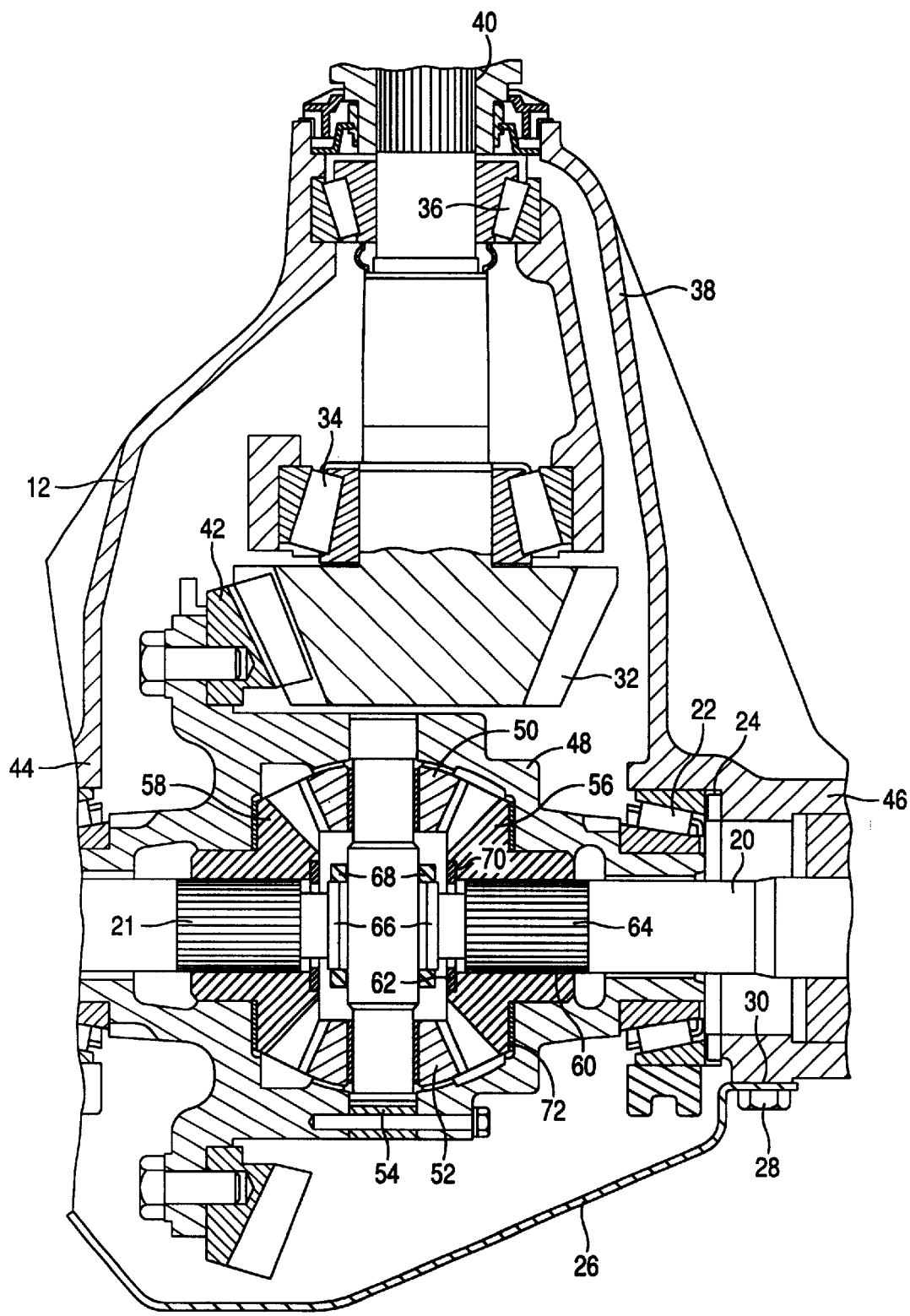
FIG. 2 is a cross section through the differential axle assembly of FIG. 1 incorporating a first embodiment of the present invention.
Figure 3A:
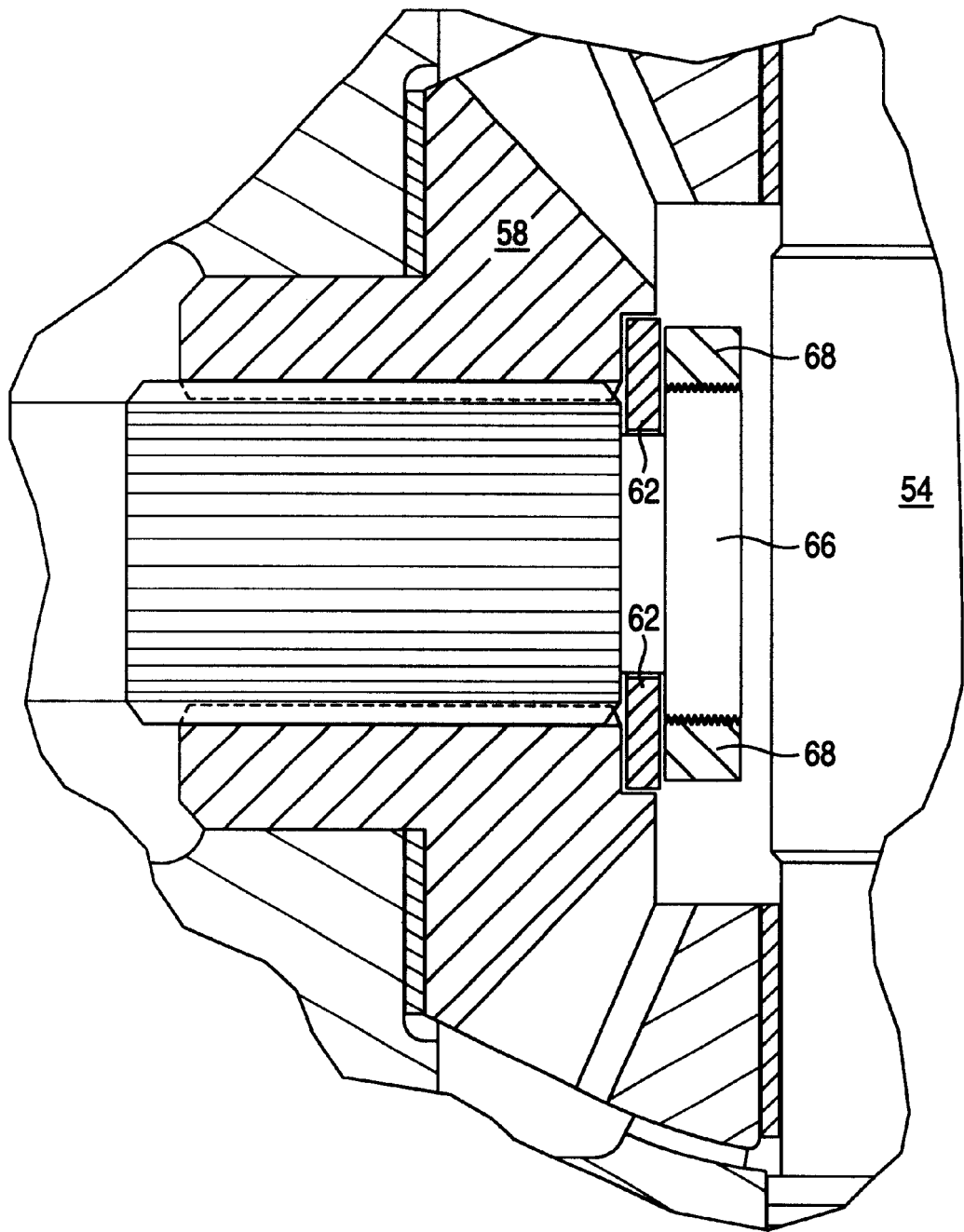
FIGS. 3a and 3b show two embodiments for the axle shaft end play adjuster.
Figure 3B:
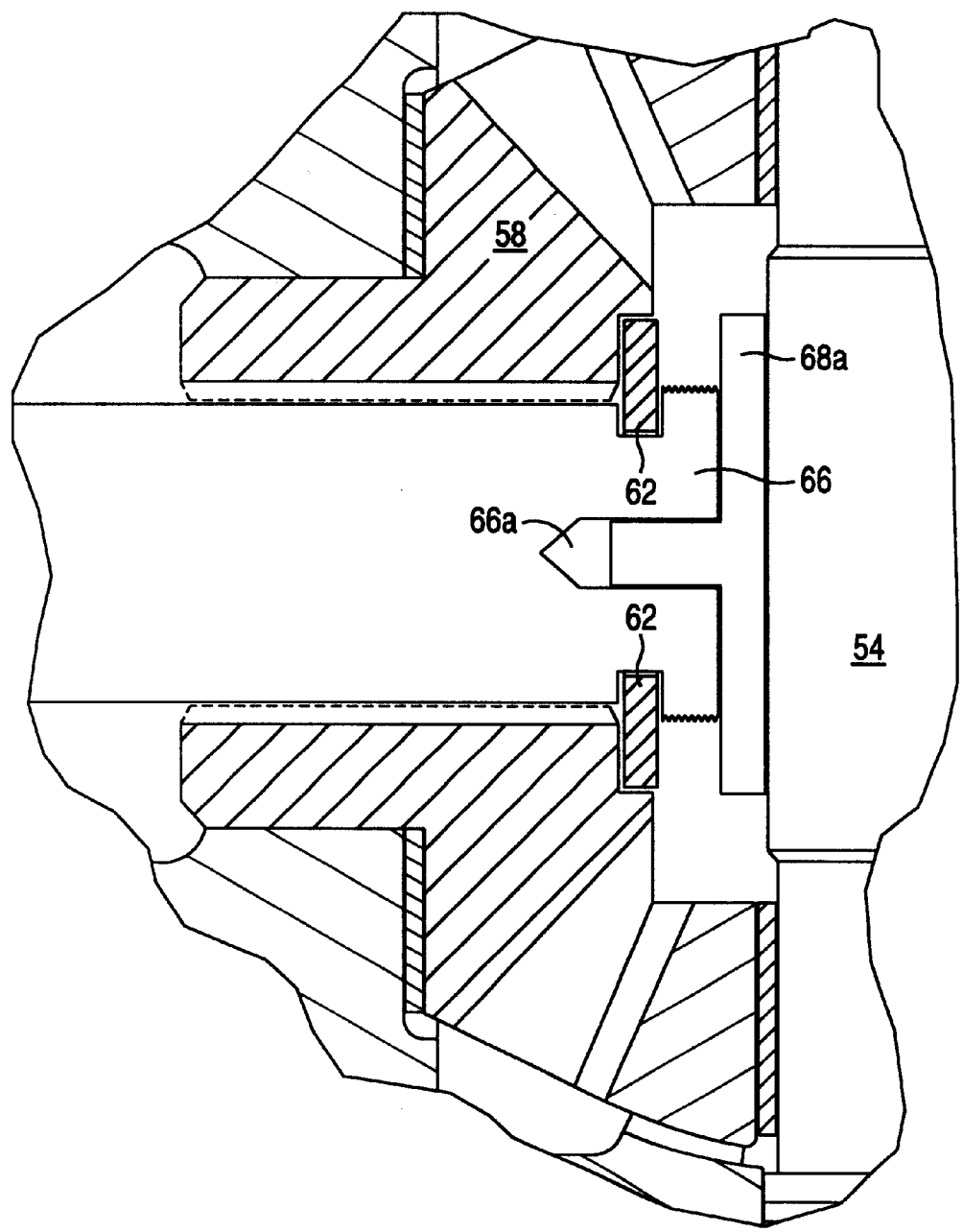

FIGS. 3a and 3b show two alternate embodiments of the adjuster 68 shown in FIG. 2. FIG. 3a is an enlarged view of the axle shaft terminal end showing the adjuster 68 with internal threads threadingly disposed on the terminal shoulder 66 having external threads, and a conventional C-ring washer 62 disposed in the slot formed adjacent the terminal shoulder 66.

FIG. 3b is an alternate arrangement wherein an adjuster 68a is formed with a screw portion having external threads and the axle shaft is formed with an internal opening 66a at its terminal end and internal threads provided on the opening 66a. The adjuster of FIG. 3b is threaded within the opening 66a. As with the embodiment of FIG. 3a, the adjuster 68a is threaded onto the terminal end of the axle shaft, and after the differential cross pin 54 is installed, the adjuster 68a is threadingly adjusted against the differential pinion shaft or cross pin 54 to eliminate all end play of the axle shaft. It is envisioned that interference threads or thread adhesive may be used to prevent loosening of the adjuster 68a.

Figure 4:
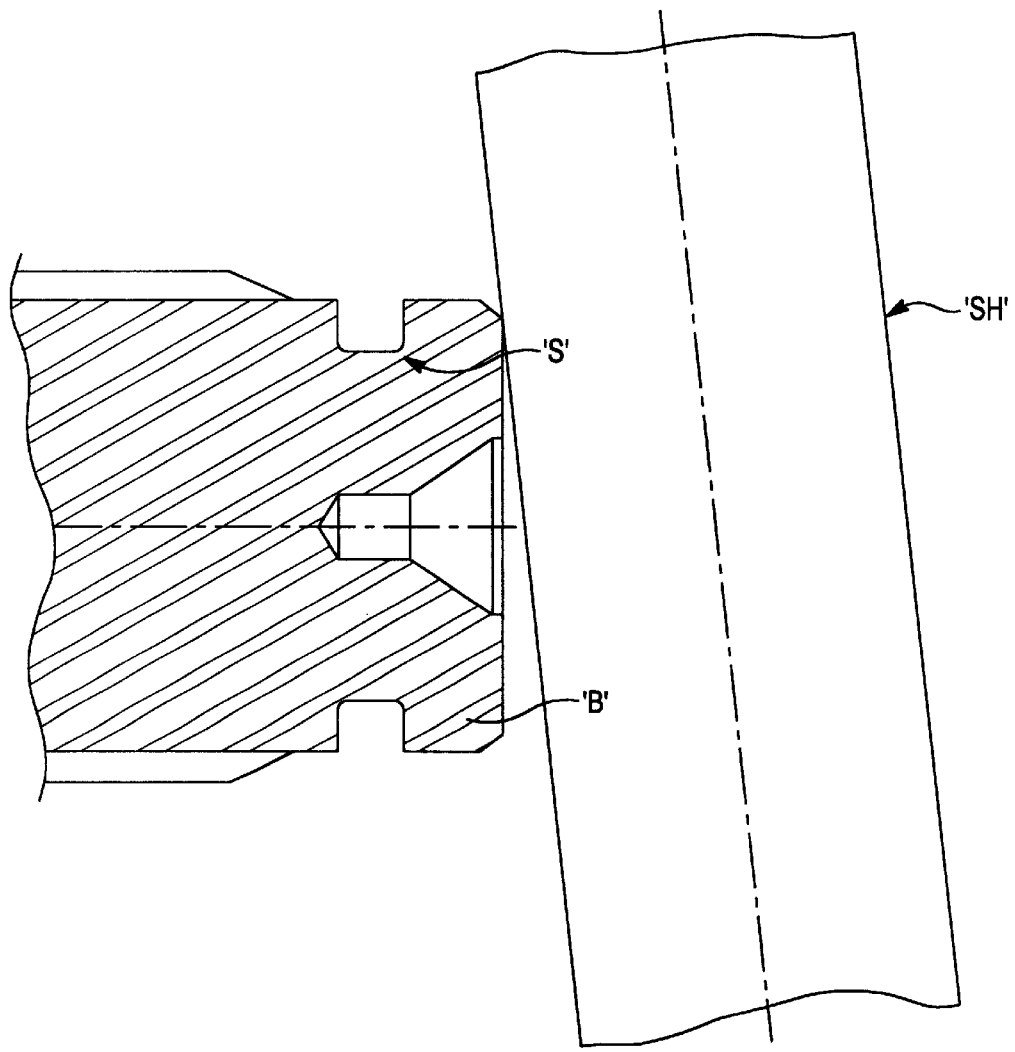
FIG. 4 is a schematic view of the stress riser created with the conventional c-ring design.

FIG. 4 is a schematic view of the end of the axle shaft having the conventional C-ring design. The C-ring axle design of FIG. 3 has less wear surface than set forth in the present invention. Additionally, the axle shaft button 'B' can break off on the C-ring design due to the stress riser 'S'. The present invention, as set forth in the following embodiments, has no button abutting the shaft 'SH' so it is less likely to break or exit the axle assembly.

Figure 5:
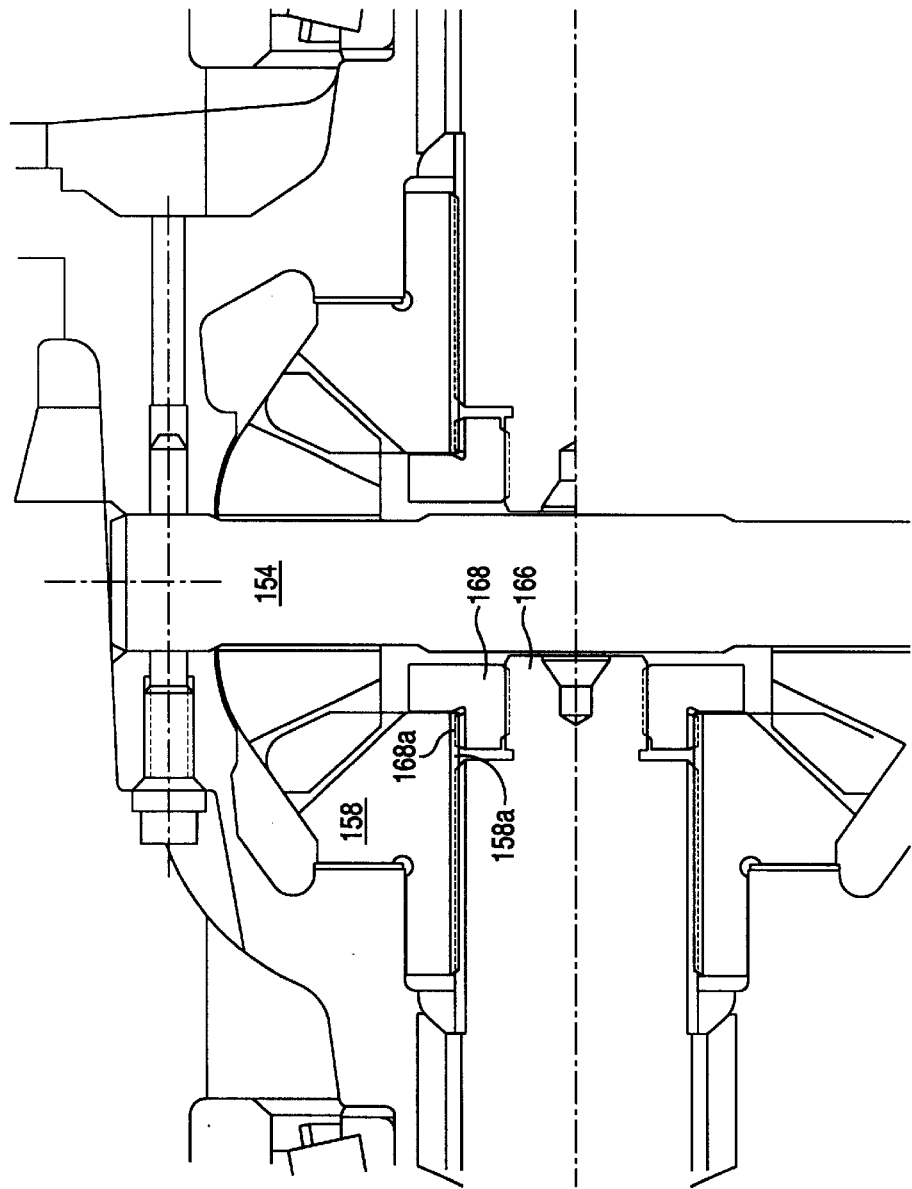
FIG. 5 is a cross section through an axle shaft showing a third embodiment of the invention.

FIG. 5 illustrates third embodiment of the present invention whereby a retaining collar 168 is threadingly disposed onto a threaded end knob 166 of the axle shaft. In addition, the retaining collar 168 is provided with external splines 168a having the same spline configuration as the side gear 158. The combination of the threaded interface between the retaining collar 168 and the shaft knob 166 as well as the spline interface between the retaining collar 168 and the side gear 158 provides a locking interface for the collar 168.

With this embodiment, the method of assembly is preformed in the following manner: the cross pin 154 is pulled out of the differential case, and the shafts one at a time are inserted through the side gears 158 where the retaining member (collar) 168 is fully threaded onto the shaft knob 166. The shaft is then pulled outboard until the external spline 168a on the collar 168 makes contact (mate) with the corresponding splines 158a of the side gear 158. The collar 168 is then turned counterclockwise just enough to engage the splines 158a. The shaft is then pulled outboard until the radially-extending flange of the collar 168 abuts the side gear 158. The same procedure is then repeated for the other axle. Then the cross pin 154 is assembled and locked in place.

Figure 6:
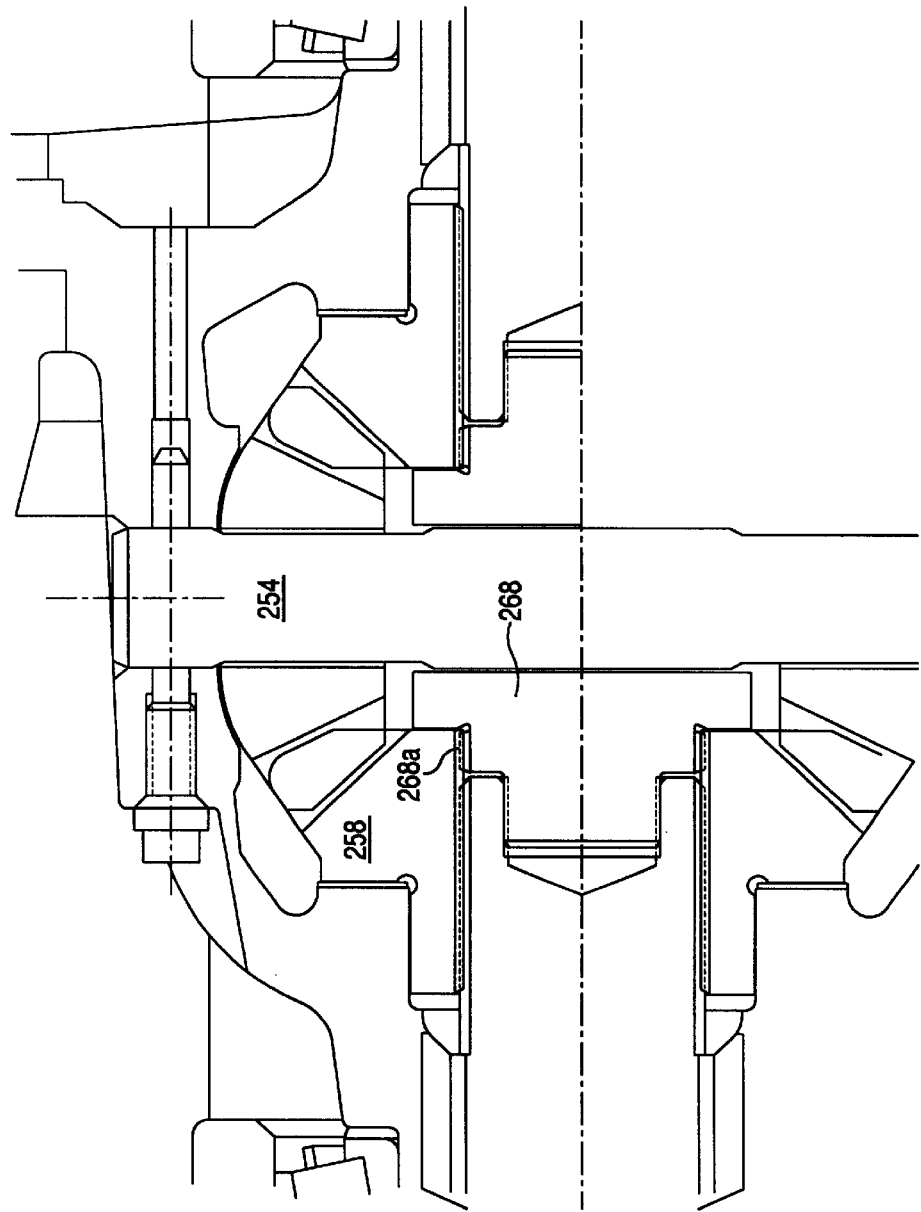
FIG. 6 is a cross section through an axle shaft showing a forth embodiment of the invention.

FIG. 6 illustrates a fourth embodiment which differs from the third embodiment in that retaining member 268 is provided with external threads that mate with internal threads provided in an axle end opening 266. As with the embodiment of FIG. 5, the retaining member 268 is provided with external splines 268a that mate with corresponding internal splines of the side gear 258.

For the embodiments of FIGS. 5 and 6, it is also noted that end play can be further controlled through the use of shims disposed between the collar flange 168, 268 and the side gear 158, 258.

As evident from the foregoing description, the present invention overcomes the drawbacks inherent in the C-ring design of the prior art by providing a number of designs that reduce or eliminate axle shaft end play in an efficient and adjustable manner. The invention further provides an effective alternative to the C-ring design known in the prior art.

The present invention reduces the tendency for wear in the differential assemblies to cause play allowing the side yokes to shift axially inwardly relative to the differential case and jar or knock against the pinion shaft. The invention reduces or eliminates the possibility that the axle shaft button will break off due to stress riser in which case the axle will exit the differential assembly. Moreover, the invention reduces or eliminates the possibility of grinding away of the end of the side yoke causing excessive negative camber, which in turn can lead to uneven tire wear and poor driving stability.

Thus the invention solves the need for a solution to the problem of stress risers and side yoke wear caused by grinding of the yoke end against the differential pinion shaft which does not involve having to replace an entire side yoke.

It is understood that although the form of the invention shown herein and described constitutes the preferred embodiment of the invention, it is not intended to illustrate all possible forms thereof. It will also be understood that words used are words of description rather than a limitation, and that various changes may be made without departing from the spirit and scope of the invention as disclosed.

What is claimed is:

1. An axle shaft motion limiting assembly for limiting axial movement of an axle shaft in a differential mechanism, said assembly comprising:

an axle shaft having a threaded portion and external splines adapted to mate with internal splines of a differential side gear;

an adjustment member threadingly engaging said threaded portion of said axle shaft adjacent a terminal end of said axle shaft to provide a locking engagement between said adjustment member and said axle shaft at said threaded portion;

wherein said adjustment member is selectively positioned along the axial direction of said axle shaft to enable a variable overall effective length of said axle shaft.

2. The axle shaft motion limiting device of claim 1, further comprising a differential pinion shaft extending adjacent said terminal end of said axle shaft, wherein said adjustment member is disposed axially closer to said differential pinion shaft than said axle shaft.

3. The axle shaft motion limiting device of claim 1, wherein said axle shaft comprises a peripherally extending groove receiving a washer disposed in said groove.

4. The axle shaft motion limiting device of claim 1, wherein said adjustment member is formed with internal threads mating with external threads defining said threaded portion of said axle shaft.

5. The axle shaft motion limiting device of claim 1, wherein said adjustment member is formed with external threads mating with internal threads defining said threaded portion of said axle shaft, said threaded portion disposed along a bore formed in said terminal end of said axle shaft.

6. The axle shaft motion limiting device of claim 5, further comprising a differential pinion shaft disposed adjacent said terminal end of said axle shaft, said adjustment member being disposed between said terminal end and said differential pinion shaft.

7. The axle shaft motion limiting device of claim 1, further comprising a differential pinion shaft disposed adjacent said terminal end of said axle shaft, said differential side gear mating with said external splines of said axle shaft.

8. The axle shaft motion limiting device of claim 7, wherein said adjustment member comprises a radially extending flange disposed between said side gear and said differential pinion shaft.

9. The axle shaft motion limiting device of claim 8, further comprising shims disposed between said radially extending flange and said side gear to further control axial end play of said axle shaft.

10. The axle shaft motion limiting device of claim 7, wherein said adjustment member threadingly engages said axle shaft and mates with splines on said side gear to thereby lock said adjustment member in place relative to said axle shaft.

11. The axle shaft motion limiting device of claim 10, wherein said adjustment member is formed with external threads mating with internal threads defining said threaded portion of said axle shaft, said threaded portion disposed along a bore formed in said terminal end of said axle shaft.

\* \* \* \* \*